United States Patent
Sugiura et al.

(10) Patent No.: US 11,270,719 B2
(45) Date of Patent: Mar. 8, 2022

(54) PITCH ENHANCEMENT APPARATUS, PITCH ENHANCEMENT METHOD, AND PROGRAM

(71) Applicant: NIPPON TELEGRAPH AND TELEPHONE CORPORATION, Chiyoda-ku (JP)

(72) Inventors: Ryosuke Sugiura, Atsugi (JP); Yutaka Kamamoto, Atsugi (JP); Takehiro Moriya, Atsugi (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 96 days.

(21) Appl. No.: 16/767,408

(22) PCT Filed: Oct. 29, 2018

(86) PCT No.: PCT/JP2018/040150
§ 371 (c)(1),
(2) Date: May 27, 2020

(87) PCT Pub. No.: WO2019/107041
PCT Pub. Date: Jun. 6, 2019

(65) Prior Publication Data
US 2020/0388301 A1    Dec. 10, 2020

(30) Foreign Application Priority Data

Dec. 1, 2017    (JP) .............................. JP2017-231747

(51) Int. Cl.
*G10L 21/0364* (2013.01)
*G10L 19/26* (2013.01)

(52) U.S. Cl.
CPC .......... *G10L 21/0364* (2013.01); *G10L 19/26* (2013.01)

(58) Field of Classification Search
CPC ...... G10L 21/0364; G10L 19/26; G10L 25/90
(Continued)

(56) References Cited

U.S. PATENT DOCUMENTS 4,058,676 A * 11/1977 Wilkes ..................... G10L 19/06
704/220
6,574,593 B1 * 6/2003 Gao ......................... G10L 19/00
704/222

(Continued)

OTHER PUBLICATIONS

Masayuki Nishiguchi, et al., "Technical Description of Sony IPC's proposals for MPEG-4 Audio and Speech coding," ISO/IEC JTC1/SC29/WG11 MPEG95/0321, XP030281907, Nov. 1995, 41 pages.

(Continued)

*Primary Examiner* — Akwasi M Sarpong
(74) *Attorney, Agent, or Firm* — Oblon, McClelland, Maier & Neustadt, L.L.P.

(57) ABSTRACT

A pitch enhancement apparatus obtains an output signal by performing, for each time segment, pitch enhancement processing on a signal derived from an input audio signal. The pitch enhancement apparatus includes a pitch enhancement unit that performs, as the pitch enhancement processing, for each time segment, processing to obtain, as an output signal at each time of the time segment, a signal including the signal at the time, a first signal for enhancement that is the signal at a time which is an earlier time than the time by the number of samples $T_0$ corresponding to a pitch period of the time segment, and a second signal for enhancement that is the signal at a time which is an earlier time than the time by the number of samples $T_{-\alpha}$ corresponding to a pitch period of the α-th time segment previous to the time segment.

20 Claims, 4 Drawing Sheets

(58) Field of Classification Search
USPC .......................................................... 704/503
See application file for complete search history.

(56) References Cited

U.S. PATENT DOCUMENTS

| | | | |
|---|---|---|---|
| 7,117,146 B2* | 10/2006 | Gao | G10L 19/08 |
| | | | 704/200.1 |
| 2002/0173951 A1* | 11/2002 | Ehara | G10L 19/18 |
| | | | 704/219 |
| 2006/0089833 A1* | 4/2006 | Su | G10L 25/90 |
| | | | 704/230 |
| 2010/0001081 A1 | 1/2010 | Morii | |
| 2010/0010810 A1* | 1/2010 | Morii | G10L 19/125 |
| | | | 704/207 |
| 2012/0101824 A1 | 4/2012 | Chen | |
| 2013/0332151 A1* | 12/2013 | Fuchs | G10L 25/78 |
| | | | 704/207 |
| 2020/0388301 A1* | 12/2020 | Sugiura | G10L 21/0364 |

OTHER PUBLICATIONS

International Search Report dated Jan. 15, 2019 in PCT/JP2018/040150 filed Oct. 29, 2018.
ITU-T Recommendation G.723.1 (May 2006), pp. 16-18, 2006, 64 total pages.
Malah et al., "A generalized comb filtering technique for speech enhancement", in ICASSP 1982, vol. 7, pp. 160-163, 1982.

* cited by examiner

PITCH ENHANCEMENT APPARATUS, PITCH ENHANCEMENT METHOD, AND PROGRAM

TECHNICAL FIELD

This invention relates to a technology to analyze and enhance a pitch component of a sample sequence derived from an audio signal in signal processing technology such as audio signal coding technology.

BACKGROUND ART

In general, when a sample sequence of a time series signal or the like is subjected to lossy compression coding, a sample sequence which is obtained at the time of decoding is a distorted sample sequence different from the original sample sequence. In coding of an audio signal, in particular, this distortion often contains a pattern that natural sounds do not have, which sometimes makes a decoded audio signal sound unnatural to a person who hears it. To address this problem, with attention being paid to a fact that many natural sounds, when observed in a certain segment, each contain a periodic component, that is, a pitch component corresponding to each sound, a technology is widely used which converts a sound into a sound closer to a natural sound by performing, on each sample of a decoded audio signal, processing to enhance a pitch component by adding an earlier sample than each sample by a pitch period.

As described in Non-patent Literature 1, for example, as processing to enhance a pitch component, processing to obtain a pitch period and processing to enhance a pitch component using the pitch period are usually performed for every given time segment.

PRIOR ART LITERATURE

Non-Patent Literature

Non-patent Literature 1: ITU-T Recommendation G.723.1 (05/2006) pp. 16-18, 2006

SUMMARY OF THE INVENTION

Problems to be Solved by the Invention

However, if a time segment in which these processing is performed is long, the following problems arise: the processing delay gets longer by the length of time of the time segment, and, although a pitch period of an input audio signal fluctuates, a pitch component corresponding to the fluctuations cannot be enhanced.

These problems can be solved by making shorter a time segment in which the above-described processing is performed. In addition, in a configuration that adopts, as in Non-patent Literature 1, for example, a combined use of decoding processing involving linear prediction and processing to enhance a pitch (pitch enhancement processing), by performing linear prediction synthesis after performing pitch enhancement processing on linear prediction residual, another problem does not arise even when a time segment is made shorter. However, in a configuration that adopts a combined use of decoding processing which does not involve linear prediction and pitch enhancement processing, a new problem arises: there is a significant increase in the amount of arithmetic processing needed to additionally perform linear predictive analysis in order to make the configuration have a configuration similar to Non-patent Literature 1 that performs linear prediction synthesis after performing pitch enhancement processing on linear prediction residual. To prevent this new problem from arising, in a configuration that adopts a combined use of decoding processing which does not involve linear prediction and pitch enhancement processing, it is necessary to perform pitch enhancement processing, such as that described in Reference Literature 1, on an audio signal itself obtained by decoding processing.

(Reference Literature 1) D. Malah and R. Cox, "A generalized comb filtering technique for speech enhancement", in ICASSP 1982, vol. 7, pp. 160-163, 1982.

However, if a time segment, in which pitch enhancement processing is performed on an audio signal itself obtained by decoding processing, is made shorter, performing pitch enhancement processing using pitch periods that vary by time segment frequently causes discontinuity in an audio signal, which results in another problem: a decoded audio signal sounds more unnatural to a person who hears it.

The present invention has been made to solve this problem and an object thereof is to achieve pitch enhancement processing that makes a decoded audio signal, which may sound unnatural due to discontinuity in an audio signal resulting from a pitch period corresponding to fluctuations in a pitch period of the audio signal, sound less unnatural to a person who hears it even when the pitch enhancement processing is performed, for every short time segment, on an audio signal itself obtained by decoding processing.

Means to Solve the Problems

In order to solve the above-described problem, according to an aspect of the present invention, a pitch enhancement apparatus obtains an output signal by performing, for each time segment, pitch enhancement processing on a signal derived from an input audio signal. The pitch enhancement apparatus includes a pitch enhancement unit that performs, as the pitch enhancement processing, for each time segment, processing to obtain, as an output signal at each time of the time segment, a signal including the signal at the time, a first signal for enhancement that is the signal at a time which is an earlier time than the time by the number of samples $T_0$ corresponding to a pitch period of the time segment, and a second signal for enhancement that is the signal at a time which is an earlier time than the time by the number of samples $T_{-\alpha}$ corresponding to a pitch period of the α-th time segment previous to the time segment.

In order to solve the above-described problem, according to another aspect of the present invention, a pitch enhancement method obtains an output signal by performing, for each time segment, pitch enhancement processing on a signal derived from an input audio signal. The pitch enhancement method includes a pitch enhancement step of performing, as the pitch enhancement processing, for each time segment, processing to obtain, as an output signal at each time of the time segment, a signal including the signal at the time, a first signal for enhancement that is the signal at a time which is an earlier time than the time by the number of samples $T_0$ corresponding to a pitch period of the time segment, and a second signal for enhancement that is the signal at a time which is an earlier time than the time by the number of samples $T_{-\alpha}$ corresponding to a pitch period of the α-th time segment previous to the time segment.

Effects of the Invention

According to the present invention, it is possible to achieve pitch enhancement processing that makes a decoded audio signal, which may sound unnatural due to discontinuity in an audio signal resulting from a pitch period corresponding to fluctuations in a pitch period of the audio signal, sound less unnatural to a person who hears it even when the pitch enhancement processing is performed, for every short time segment, on an audio signal itself obtained by decoding processing.

DETAILED DESCRIPTION OF THE EMBODIMENTS

Figure 1:
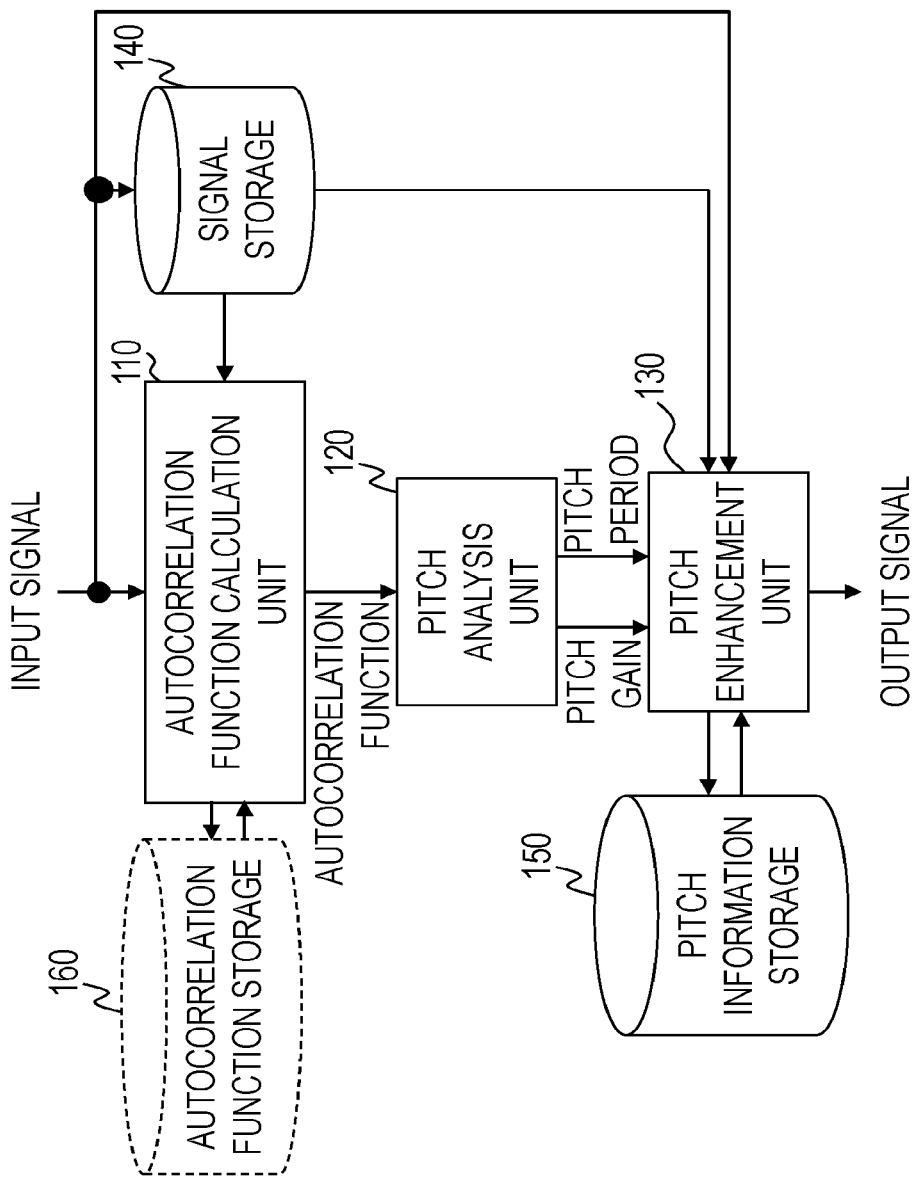
FIG. 1 is a functional block diagram of a pitch enhancement apparatus according to a first embodiment.

Hereinafter, an embodiment of the present invention will be described. It is to be noted that, in the drawings which are used in the following description, component units having the same function and steps in which the same processing is performed are identified with the same reference characters and overlapping explanations are omitted. In the following description, it is assumed that processing which is performed element by element of a vector and a matrix is applied to all the elements of the vector and the matrix unless otherwise specified.

Point of a First Embodiment

In the present embodiment, when pitch enhancement processing is performed on an input audio signal itself of the current time segment, not only a pitch component corresponding to a pitch period of the current time segment, but also a pitch component corresponding to a pitch period of an earlier time segment is enhanced.

In this case, it is preferable to make the degree of enhancement of a pitch component corresponding to a pitch period of an earlier time segment lower than the degree of enhancement of a pitch component corresponding to a pitch period of the current time segment. Moreover, when pitch components corresponding to pitch periods of a plurality of earlier time segments are enhanced, preferably, the more distant a time segment is from the current time segment, the lower the degree of enhancement thereof is made. It is to be noted that enhancement of a component corresponding to a pitch period of each time segment is performed based on pitch gain.

Moreover, to maintain energy integrity after enhancement, the extent to which pitch enhancement is performed should be determined based on all the pitch components used. When pitch components corresponding to pitch periods of a plurality of earlier time segments are enhanced, energy integrity after enhancement should be maintained also based on the hypothesis that the pitch periods are values close to each other.

First Embodiment

Figure 2:
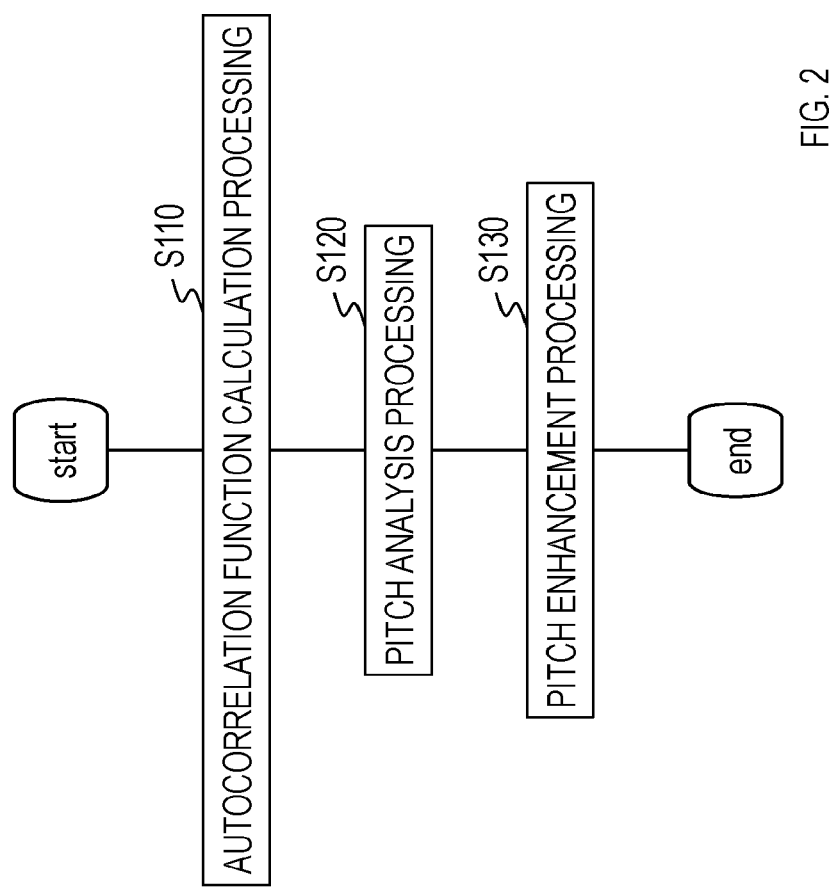
FIG. 2 is a diagram showing an example of a processing flow of the pitch enhancement apparatus according to the first embodiment.

FIG. 1 shows a functional block diagram of a speech pitch enhancement apparatus according to the first embodiment and FIG. 2 shows a processing flow of the speech pitch enhancement apparatus.

A processing procedure of the speech pitch enhancement apparatus of the first embodiment will be described with reference to FIG. 1. The speech pitch enhancement apparatus of the first embodiment obtains a pitch period and pitch gain by analyzing an input signal and enhances a pitch based on the pitch period and the pitch gain. The speech pitch enhancement apparatus of the first embodiment includes an autocorrelation function calculation unit 110, a pitch analysis unit 120, a pitch enhancement unit 130, a signal storage 140, and a pitch information storage 150; the speech pitch enhancement apparatus of the first embodiment may further include an autocorrelation function storage 160.

The speech pitch enhancement apparatus is a special apparatus configured as a result of a special program being read into a publicly known or dedicated computer including, for example, a central processing unit (CPU), a main storage unit (random access memory: RAM), and so forth. The speech pitch enhancement apparatus executes each processing under the control of the central processing unit, for example. The data input to the speech pitch enhancement apparatus and the data obtained by each processing are stored in the main storage unit, for instance, and the data stored in the main storage unit is read into the central processing unit when necessary and used for other processing. At least part of each processing unit of the speech pitch enhancement apparatus may be configured with hardware such as an integrated circuit. Each storage of the speech pitch enhancement apparatus can be configured with, for example, a main storage unit such as random access memory (RAM) or middleware such as a relational database or a key-value store. It is to be noted that the speech pitch enhancement apparatus does not necessarily have to include each storage; each storage may be configured with an auxiliary storage unit configured with a hard disk, an optical disk, or a semiconductor memory device such as flash memory and provided outside the speech pitch enhancement apparatus.

Main processing which is performed by the speech pitch enhancement apparatus of the first embodiment includes autocorrelation function calculation processing (S110), pitch analysis processing (S120), and pitch enhancement processing (S130) (see FIG. 2). Since these processing is performed by a plurality of hardware resources of the speech pitch enhancement apparatus in cooperation with each other, each of the autocorrelation function calculation processing (S110), the pitch analysis processing (S120), and the pitch enhancement processing (S130) will be explained in the following description along with related processing.

[Autocorrelation Function Calculation Processing (S110)]

First, the autocorrelation function calculation processing, which is performed by the speech pitch enhancement apparatus, and related processing will be described.

A time domain audio signal is input to the autocorrelation function calculation unit 110. This audio signal is a signal obtained by performing compression coding of a sound signal such as a speech signal by a coding device and decoding the codes by a decoding device corresponding to the coding device. A sample sequence of a time domain audio signal of the current frame, which was input to the speech pitch enhancement apparatus, is input to the autocorrelation function calculation unit 110 in frames (time segments), each having a predetermined length of time. Assume that a positive integer representing the length of a sample sequence of one frame is N; then, N time domain audio signal samples that make up a sample sequence of a time domain audio signal of the current frame are input to the autocorrelation function calculation unit 110. The autocorrelation function calculation unit 110 calculates an autocorrelation function $R_0$ at time lag 0 and autocorrelation functions $R_{\tau(1)}, \ldots, R_{\leqq(M)}$ for each of a plurality of (M; M is a positive integer) predetermined time lags $\tau(1), \ldots, \tau(M)$ in a sample sequence of the latest L (L is a positive integer) audio signal samples including the input N time domain audio signal samples. That is, the autocorrelation function calculation unit 110 calculates autocorrelation functions in a sample sequence of the latest audio signal samples including the time domain audio signal samples of the current frame.

In the following description, the autocorrelation functions calculated by the autocorrelation function calculation unit 110 in processing of the current frame, that is, the autocorrelation functions in a sample sequence of the latest audio signal samples including the time domain audio signal samples of the current frame will also be referred to as the "autocorrelation functions of the current frame"; likewise, if a certain earlier frame is assumed to be a frame F, the autocorrelation functions calculated by the autocorrelation function calculation unit 110 in processing of the frame F, that is, the autocorrelation functions in a sample sequence of the latest audio signal samples at the frame F, which include the time domain audio signal samples of the frame F, will also be referred to as the "autocorrelation functions of the frame F". Moreover, the "autocorrelation function" will also be referred to simply as the "autocorrelation". When L is a value greater than N, the speech pitch enhancement apparatus includes the signal storage 140 to use the latest L audio signal samples for calculation of autocorrelation functions. The signal storage 140 is configured so that the signal storage 140 can store at least L−N audio signal samples, and L−N audio signal samples $X_0, X_1, \ldots, X_{L-N-1}$ input by the previous frame are stored therein. Then, when the N time domain audio signal samples of the current frame are input, the autocorrelation function calculation unit 110 reads the L−N audio signal samples $X_0, X_1, \ldots, X_{L-N-1}$ stored in the signal storage 140 and obtains the latest L audio signal samples $X_0, X_1, \ldots, X_{L-1}$ by assigning the input N time domain audio signal samples to $X_{L-N}, X_{L-N+1}, \ldots, X_{L-1}$.

When L=N, the input N time domain audio signal samples only have to be used as the latest L audio signal samples $X_0, X_1, \ldots, X_{L-1}$. In this case, the speech pitch enhancement apparatus does not have to include the signal storage 140.

Then, the autocorrelation function calculation unit 110 calculates an autocorrelation function $R_0$ at time lag 0 and autocorrelation functions $R_{\tau(1)}, \ldots, R_{\tau(M)}$ for each of a plurality of predetermined time lags $\tau(1), \ldots, \tau(M)$ by using the latest L audio signal samples $X_0, X_1, \ldots, X_{L-1}$. If a time lag such as $\tau(1), \ldots, \tau(M)$ and 0 is assumed to be $\tau$, the autocorrelation function calculation unit 110 calculates an autocorrelation function $R_\tau$ by Formula (1) below, for example.

$$R_\tau = \sum_{l=\tau}^{L-1} X_l X_{l-\tau} \tag{1}$$

The autocorrelation function calculation unit 110 outputs the calculated autocorrelation functions $R_0$ and $R_{\tau(1)}, \ldots, R_{\tau(M)}$ to the pitch analysis unit 120.

Here, these time lags $\tau(1), \ldots, \tau(M)$ are candidates for a pitch period $T_0$ of the current frame, which is obtained by the pitch analysis unit 120 which will be described later. For example, for an audio signal whose principal component is a speech signal sampled at a sampling frequency of 32 kHz, integer values from 75 to 320 which are suitable for candidates for a speech pitch period can be adopted as $\tau(1), \ldots, \tau(M)$, for instance. In place of $R_\tau$ in Formula (1), a normalized autocorrelation function $R_\tau/R_0$, which is obtained by dividing $R_\tau$ in Formula (1) by $R_0$, may be obtained. It is to be noted that, when, for example, L is set at a sufficiently large value such as 8192 for integer values from 75 to 320 which are candidates for a pitch period $T_0$, it is better to calculate the autocorrelation function $R_\tau$ by a method that curbs the amount of computation, which will be described below, rather than to obtain a normalized autocorrelation function $R_\tau/R_0$ in place of the autocorrelation function $R_\tau$.

The autocorrelation function $R_\tau$ may be calculated by Formula (1) itself; alternatively, a value that is the same as a value which is obtained by Formula (1) may be calculated by another calculation method. For instance, the speech pitch enhancement apparatus may include the autocorrelation function storage 160 and store therein the autocorrelation functions (the autocorrelation functions of the immediately preceding frame) $R_{\tau(1)}, \ldots, R_{\tau(M)}$ obtained by processing to calculate autocorrelation functions of the previous frame (the immediately preceding frame), and the autocorrelation function calculation unit 110 may calculate the autocorrelation functions $R_{\tau(1)}, \ldots, R_{\tau(M)}$ of the current frame by adding the contributions of the newly input audio signal samples of the current frame to and subtracting the contributions of the earliest frame from each of the autocorrelation functions (the autocorrelation functions of the immediately preceding frame) $R_{\tau(1)}, \ldots, R_{\tau(M)}$ read from the autocorrelation function storage 160, which were obtained by the processing of the immediately preceding frame. This makes it possible to curb the amount of computation needed to calculate autocorrelation functions compared to calculation performed by using Formula (1) itself. In this case, if each of $\tau(1), \ldots, \tau(M)$ is assumed to be $\tau$, the autocorrelation function calculation unit 110 obtains the autocorrelation function $R_\tau$ of the current frame by adding a difference $\Delta R_\tau^+$, which is obtained by Formula (2) below, to and subtracting a difference $\Delta R_\tau^-$, which is obtained by Formula (3), from the autocorrelation function $R_\tau$ (the autocorrelation function $R_\tau$ of the immediately preceding frame) obtained by the processing of the immediately preceding frame.

$$\Delta R_\tau^+ = \sum_{l=L-N}^{L-1} X_l X_{l-\tau} \tag{2}$$

$$\Delta R_\tau^- = \sum_{l=\tau}^{N-1+\tau} X_l X_{l-\tau} \tag{3}$$

Moreover, the amount of computation may be reduced by calculating an autocorrelation function by processing similar to that described above using, not the latest L audio signal samples themselves of an input audio signal, a signal whose number of samples is reduced by, for example, performing downsampling on the L audio signal samples or decimating samples. In this case, when, for example, the number of samples is reduced by half, M time lags τ(1), ..., τ(M) are expressed by using half the number of samples. For instance, when the above-described 8192 audio signal samples obtained by sampling at a sampling frequency of 32 kHz are downsampled to 4096 samples obtained by sampling at a sampling frequency of 16 kHz, it is only necessary to change τ(1), ..., τ(M), which are candidates for a pitch period T, from the integer values from 75 to 320 to integer values from 37 to 160, which are about half of the integer values from 75 to 320.

After the speech pitch enhancement apparatus completes processing which is performed on the current frame by the pitch enhancement unit 130, which will be described later, the signal storage 140 updates the storage contents so as to store the latest L−N audio signal samples at this point. Specifically, for example, when L>2N, the signal storage 140 deletes the oldest N audio signal samples $X_0, X_1, \ldots, X_{N-1}$ of the stored L−N audio signal samples, assigns $X_N, X_{N+1}, \ldots, X_{L-N-1}$ to $X_0, X_1, \ldots, X_{L-2N-1}$, and newly stores the input N time domain audio signal samples of the current frame as $X_{L-2N}, X_{L-2N+1}, \ldots, X_{L-N-1}$. Moreover, when L≤2N, the signal storage 140 deletes the stored L−N audio signal samples $X_0, X_1, \ldots, X_{L-N-1}$ and newly stores the latest L−N audio signal samples of the input N time domain audio signal samples of the current frame as $X_0, X_1, \ldots, X_{L-N-1}$.

Furthermore, after the autocorrelation function calculation unit 110 completes calculation of an autocorrelation function of the current frame, the autocorrelation function storage 160 updates the storage contents so as to store the calculated autocorrelation functions $R_{\tau(1)}, \ldots, R_{\tau(M)}$ of the current frame. Specifically, the autocorrelation function storage 160 deletes the stored $R_{\tau(1)}, \ldots, R_{\tau(M)}$ and newly stores the calculated autocorrelation functions $R_{\tau(1)}, \ldots, R_{\tau(M)}$ of the current frame.

The above description is based on the assumption that the latest L audio signal samples include the N audio signal samples of the current frame (that is, L≥N); however, L does not necessarily have to be greater than or equal to N and L may be less than N. In this case, the autocorrelation function calculation unit 110 only has to calculate an autocorrelation function $R_0$ at time lag 0 and autocorrelation functions $R_{\tau(1)}, \ldots, R_{\tau(M)}$ for each of a plurality of predetermined time lags τ(1), ..., τ(M) by using L consecutive audio signal samples $X_0, X_1, \ldots, X_{L-1}$ included in the N audio signal samples of the current frame, and, as in the case where L=N, the speech pitch enhancement apparatus does not have to include the signal storage 140.

[Pitch Analysis Processing (S120)]

Next, the pitch analysis processing which is performed by the speech pitch enhancement apparatus will be described.

The autocorrelation functions $R_0$ and $R_{\tau(1)}, \ldots, R_{\tau(M)}$ of the current frame, which were output from the autocorrelation function calculation unit 110, are input to the pitch analysis unit 120.

The pitch analysis unit 120 obtains the largest value among the autocorrelation functions $R_{\tau(1)}, \ldots, R_{\tau(M)}$ of the current frame for predetermined time lags, obtains the ratio between the largest value of the autocorrelation function and the autocorrelation function $R_0$ at time lag 0 as the pitch gain $\sigma_0$ of the current frame, obtains a time lag at which the value of the autocorrelation function becomes the largest value as a pitch period $T_0$ of the current frame, and outputs the obtained pitch gain $\sigma_0$ and pitch period $T_0$ to the pitch enhancement unit 130. Here, in the following description, the pitch gain and the pitch period of the s-th frame previous to the current frame are written as $\sigma_{-s}$ and $T_{-s}$, respectively.

[Pitch Enhancement Processing (S130)]

Next, the pitch enhancement processing, which is performed by the speech pitch enhancement apparatus, and related processing will be described.

The pitch enhancement unit 130 receives the pitch period and the pitch gain output from the pitch analysis unit 120 and the time domain audio signal of the current frame, which was input to the speech pitch enhancement apparatus, and outputs, for an audio signal sample sequence of the current frame, a sample sequence of an output signal obtained by enhancing a pitch component corresponding to the pitch period $T_0$ of the current frame and a pitch component corresponding to a pitch period of an earlier frame. For example, the pitch enhancement unit 130 obtains, as an output signal $X^{new}_n$ corresponding to a signal at each time n included in a signal (a time domain audio signal of the current frame) $X_n$ (L−N≤n≤L−1), which is made up of N samples, of a time segment, a signal including the signal $X_n$ at the time n, a signal (hereinafter also referred to as a first signal for enhancement, which is a pitch component corresponding to the pitch period $T_0$ of the current frame) $X_{n-T\_0}$ (where A_B in a subscript means $A_B$) at a time n−$T_0$ that is an earlier time than the time n by the number of samples $T_0$ corresponding to the pitch period $T_0$ of the current frame, and a signal (hereinafter also referred to as a second signal for enhancement, which is a pitch component corresponding to a pitch period of the immediately preceding frame) $X_{n-T\_{-1}}$ at a time n−$T_{-1}$ that is an earlier time than the time n by the number of samples $T_{-1}$ corresponding to the pitch period $T_{-1}$ of the immediately preceding frame and outputs the signal.

Hereinafter, a specific example will be described.

The pitch period $T_{-1}$ and the pitch gain $\sigma_{-1}$ of the previous frame are stored in the pitch information storage 150.

The pitch enhancement unit 130 performs pitch enhancement processing on the sample sequence of the audio signal of the current frame using the input pitch gain $\sigma_0$ of the current frame, the pitch gain $\sigma_{-1}$ of the previous frame, which was read from the pitch information storage 150, the input pitch period $T_0$ of the current frame, and the pitch period $T_{-1}$ of the previous frame, which was read from the pitch information storage 150. Specifically, the pitch enhancement unit 130 obtains a sample sequence, which consists of N samples $X^{new}_{L-N}, \ldots, X^{new}_{L-1}$, of an output signal of the current frame by obtaining an output signal $X^{new}_n$ for each sample $X_n$ (L−N≤n≤L−1), which makes up the input sample sequence of the audio signal of the current frame, by Formula (4) below.

$$X^{new}_n = \frac{1}{A}\left[X_n + \frac{3}{4}\sigma_0 X_{n-T_0} + \frac{1}{4}\sigma_{-1} X_{n-T_{-1}}\right] \quad (4)$$

Here, A in Formula (4) is an amplitude correction factor which is determined by Formula (5) below.

$$A = \sqrt{1 + \frac{9}{16}\sigma_0^2 + \frac{1}{16}\sigma_{-1}^2 + \frac{3}{8}\sigma_0\sigma_{-1}} \quad (5)$$

The pitch enhancement processing of Formula (4) is processing that enhances a pitch component with consideration given not only to a pitch period, but also to pitch gain.

Furthermore, the pitch enhancement processing of Formula (4) is processing that enhances a pitch component corresponding to the pitch period $T_0$ of the current frame and, at the same time, also enhances a pitch component corresponding to the pitch period $T_{-1}$ in the immediately preceding frame, making the degree of enhancement lower than the degree of enhancement of a pitch component corresponding to the pitch period $T_0$ of the current frame. By this pitch enhancement processing, even when pitch enhancement processing is performed on a short time segment (frame)-by-short time segment basis, it is possible to obtain the effect of reducing discontinuity between frames caused by fluctuations in a pitch period.

Specifically, in Formula (4), by multiplying a pitch component corresponding to the pitch period $T_1$ of the immediately preceding frame by ¼ which is a value smaller than ¾ by which a pitch component corresponding to the pitch period $T_0$ of the current frame is multiplied, a pitch component $\sigma_{-1}X_{n-T_{-1}}$ corresponding to the pitch period $T_{-1}$ in the immediately preceding frame is also enhanced with the degree of enhancement being made lower than the degree of enhancement of a pitch component $\sigma_0 X_{n-T\_0}$ corresponding to the pitch period $T_0$ of the current frame.

(First Modification)

It is to be noted that values such as ¾ and ¼ are examples; in place of Formula (4), an output signal $X^{new}_n$ may be obtained by Formula (4A) below by using $B_0$ and $B_{-1}$ which are predetermined values.

$$X_n^{new} = \frac{1}{A}[X_n + B_0\sigma_0 X_{n-T_0} + B_{-1}\sigma_{-1}X_{n-T_{-1}}] \quad (4A)$$

It is preferable that $B_0 > B_{-1}$ in Formula (4A); however, even when $B_0 \leq B_{-1}$, the effect of reducing discontinuity between frames caused by fluctuations in a pitch period can be obtained.

The amplitude correction factor A which is obtained by Formula (5) above allows the energy of a pitch component to be preserved before and after pitch enhancement if the assumption is made that the pitch period $T_0$ of the current frame and the pitch period $T_1$ of the immediately preceding frame are values sufficiently close to each other. That is, when an output signal $X^{new}_n$ is obtained by Formula (4A), a value which is obtained by Formula (5A) below only has to be used as the amplitude correction factor A.

$$A = \sqrt{1 + B_0^2\sigma_0^2 + B_{-1}^2\sigma_{-1}^2 + 2B_0 B_{-1}\sigma_0\sigma_{-1}} \quad (5A)$$

(Second Modification)

In place of a value which is obtained by Formula (5) or Formula (5A), a predetermined value which is greater than or equal to 1 may be used as the amplitude correction factor A, or an output signal $X^{new}_n$ may be obtained by Formula (4B) or Formula (4C) without using the amplitude correction factor A.

$$X_n^{new} = [X_n + \tfrac{3}{4}\sigma_0 X_{n-T_0} + \tfrac{1}{4}\sigma_{-1}X_{n-T_{-1}}] \quad (4B)$$

$$X_n^{new} = [X_n + B_0\sigma_0 X_{n-T_0} + B_{-1}\sigma_{-1}X_{n-T_{-1}}] \quad (4C)$$

(Third Modification)

Moreover, by also enhancing a pitch component corresponding to a pitch period in a much earlier frame (the second or higher order frame previous to the current frame), discontinuity between frames caused by fluctuations in a pitch period can be further reduced. In this case, preferably, the earlier pitch period a pitch period is, the smaller a coefficient by which a value, which is added to enhance a pitch component corresponding to a pitch period, is multiplied is set, as in Formula (6) below, for example. In addition, as in Formula (6) below, for example, it is preferable to perform calculation of the amplitude correction factor, including the pitch gain of a much earlier frame (the second or higher order frame previous to the current frame).

$$X_n^{new} = \frac{1}{A}\left[X_n + \frac{3}{4}\sigma_0 X_{n-T_0} + \frac{3}{16}\sigma_{-1}X_{n-T_{-1}} + \frac{1}{16}\sigma_{-2}X_{n-T_{-2}}\right] \quad (6)$$

$$A = \sqrt{\begin{array}{l}1 + \frac{9}{16}\sigma_0^2 + \frac{9}{256}\sigma_{-1}^2 + \frac{1}{256}\sigma_{-2}^2 + \\ \frac{9}{32}\sigma_0\sigma_{-1} + \frac{3}{32}\sigma_0\sigma_{-2} + \frac{3}{128}\sigma_{-1}\sigma_{-2}\end{array}}$$

Here, in Formula (6), $T_{-2}$ and $\sigma_{-2}$ are the pitch period and the pitch gain, respectively, of the second frame previous to the current frame. That is, Formula (6) is an example of a case where an output signal $X^{new}_n$ is obtained by processing that enhances a pitch component corresponding to the pitch period $T_0$ of the current frame and, at the same time, also enhances a pitch component corresponding to the pitch period $T_{-1}$ in the previous frame and a pitch component corresponding to the pitch period $T_{-2}$ in the second frame previous to the current frame. It goes without saying that a modification similar to, for example, a modification made to Formula (4) to obtain Formula (4A) or a modification made to Formula (5) to obtain Formula (5A) may be made to Formula (6). That is, an output signal $X^{new}_n$ may be obtained by Formula (6A) below by using $B_0$, $B_{-1}$, and $B_{-2}$ which are predetermined values.

$$X_n^{new} = \frac{1}{A}[X_n + B_0\sigma_0 X_{n-T_0} + B_{-1}\sigma_{-1}X_{n-T_{-1}} + B_{-2}\sigma_{-2}X_{n-T_{-2}}] \quad (6A)$$

$$A = \sqrt{1 + B_0^2\sigma_0^2 + B_{-1}^2\sigma_{-1}^2 + B_{-2}^2\sigma_{-2}^2 + E + F + G}$$

$$E = 2B_0 B_{-1}\sigma_0\sigma_{-1}$$

$$F = 2B_0 B_{-2}\sigma_0\sigma_{-2}$$

$$G = 2B_{-1}B_{-2}\sigma_{-1}\sigma_{-2}$$

In these cases, the pitch information storage 150 also stores the pitch period $T_{-2}$ and the pitch gain $\sigma_{-2}$ of the second frame previous to the current frame.

Moreover, processing that also enhances, for example, a pitch component corresponding to a pitch period in the third frame previous to the current frame may be performed. It goes without saying that, in this case, the pitch information storage 150 also stores the pitch period $T_{-3}$ and the pitch gain $\sigma_{-3}$ of the third frame previous to the current frame.

(Fourth Modification)

In place of a value based on an earlier sample than each sample by each pitch period, which is added to each sample of an input audio signal in the processing which is performed by the pitch enhancement unit 130, an earlier sample than each sample by each pitch period in an audio signal that was passed through a low-pass filter may be used or an earlier sample than each sample by each pitch period in an audio signal subjected to processing equivalent to a low-pass filter may be used. For instance, when processing equivalent to a symmetrical low-pass filter is performed along with the processing of Formula (4) above, an output signal $X^{new}_n$ only has to be obtained by Formula (7) below. Formula (7) below performs processing equivalent to a symmetrical low-pass filter by addition of a value based on a sample around an earlier sample than each sample by each pitch period in the pitch enhancement processing.

$$X_n^{new} = \frac{1}{A}\left[X_n + \frac{3}{4}\sigma_0 C + \frac{1}{4}\sigma_{-1} D\right] \quad (7)$$

$$C = \left(\frac{1}{8}X_{n-T_0-1} + \frac{3}{4}X_{n-T_0} + \frac{1}{8}X_{n-T_0+1}\right)$$

$$D = \left(\frac{1}{8}X_{n-T_{-1}-1} + \frac{3}{4}X_{n-T_{-1}} + \frac{1}{8}X_{n-T_{-1}+1}\right)$$

(Fifth Modification)

It is to be noted that, when pitch gain is less than a predetermined threshold $Th_\sigma$ in the above-described pitch enhancement processing, pitch enhancement processing that does not include the pitch component may be performed. For example, when the pitch gain $\sigma_0$ of the current frame is a value less than the threshold $Th_\sigma$ and the pitch gain $\sigma_{-1}$ of the previous frame is a value greater than or equal to the threshold $Th_\sigma$ at the time of execution of the pitch enhancement processing of Formula (4), an output signal $X^{new}_n$ may be obtained by Formula (8) below.

$$X_n^{new} = \frac{1}{A}\left[X_n + \frac{1}{4}\sigma_{-1} X_{n-T_{-1}}\right]\left(A = \sqrt{1 + \frac{1}{16}\sigma_{-1}^2}\right) \quad (8)$$

Moreover, for instance, when the pitch gain $\sigma_0$ of the current frame is a value greater than or equal to the threshold $Th_\sigma$, the pitch gain $\sigma_{-1}$ of the previous frame is a value less than the threshold $Th_\sigma$, and the pitch gain $\sigma_{-2}$ of the second frame previous to the current frame is a value greater than or equal to the threshold $Th_\sigma$ at the time of execution of the pitch enhancement of Formula (6), it is only necessary to obtain an output signal $X^{new}_n$ by Formula (9) below.

$$X_n^{new} = \frac{1}{A}\left[X_n + \frac{3}{4}\sigma_0 X_{n-T_0} + \frac{1}{16}\sigma_{-2} X_{n-T_{-2}}\right] \quad (9)$$

$$A = \sqrt{1 + \frac{9}{16}\sigma_0^2 + \frac{1}{256}\sigma_{-2}^2 + \frac{3}{32}\sigma_0\sigma_{-2}}$$

It is to be noted that the pitch information storage 150 updates the storage contents so that the pitch period and the pitch gain of the current frame can be used as the pitch period and the pitch gain of an earlier frame in processing which is performed on the next frame by the pitch enhancement unit 130. For example, when the pitch enhancement unit 130 performs the processing of Formula (4), the pitch information storage 150 deletes the stored pitch period $T_{-1}$ and pitch gain $\sigma_{-1}$ of the previous frame and newly stores the pitch period $T_0$ of the current frame as the pitch period $T_{-1}$ and newly stores the pitch gain $\sigma_0$ of the current frame as the pitch gain $\sigma_{-1}$. Likewise, when the pitch enhancement unit 130 performs the processing of Formula (6), the pitch information storage 150 deletes the stored pitch period $T_{-2}$ and pitch gain $\sigma_{-2}$ of the second frame previous to the current frame, assigns the stored pitch period $T_{-1}$ and pitch gain $\sigma_{-1}$ of the previous frame to $T_{-2}$ and $\sigma_{-2}$, respectively, and newly stores the pitch period $T_0$ and the pitch gain $\sigma_0$ of the current frame as $T_{-1}$ and $\sigma_{-1}$, respectively.

(Sixth Modification)

The above-described second signal for enhancement does not necessarily have to be a pitch component corresponding to a pitch period of the immediately preceding frame; the second signal for enhancement only has to be a pitch component corresponding to a pitch period of the α-th frame previous to the current frame. Here, a is any one of integers greater than or equal to 1. That is, the pitch enhancement unit 130 may obtain, as an output signal $X^{new}_n$ corresponding to a signal at each time n included in a time domain audio signal sample $X_n$ (L–N≤n≤L–1) of the current frame, a signal including the signal $X_n$ at the time n, a signal (hereinafter also referred to as a first signal for enhancement, which is a pitch component corresponding to the pitch period $T_0$ of the current frame) $X_{n-T_0}$ at a time n–$T_0$ that is an earlier time than the time n by the number of samples $T_0$ corresponding to the pitch period $T_0$ of the current frame, and a signal (hereinafter also referred to as a second signal for enhancement, which is a pitch component corresponding to a pitch period of the α-th frame previous to the current frame) $X_{n-T_{-\alpha}}$ at a time n–$T_{-\alpha}$ that is an earlier time than the time n by the number of samples $T_{-\alpha}$ corresponding to the pitch period $T_{-\alpha}$ of the α-th frame previous to the current frame. For example, the pitch enhancement unit 130 may perform processing to obtain, as an output signal $X^{new}_n$ corresponding to a signal at each time n included in an audio signal sample $X_n$ (L–N≤n≤L–1) of the current frame, a signal obtained by dividing a signal, which is obtained by adding the signal $X_n$ at the time n, a signal obtained by multiplying the first signal for enhancement $X_{n-T_0}$ by the pitch gain $\sigma_0$ of the current frame and a predetermined coefficient $B_0$ which is a value less than 1, and a signal obtained by multiplying the second signal for enhancement $X_{n-T_{-\alpha}}$ by the pitch gain $\sigma_{-\alpha}$ of the α-th frame previous to the current frame and a predetermined coefficient $B_{-\alpha}$ which is a value less than 1, by $$A = \sqrt{1 + B_0^2\sigma_0^2 + B_{-\alpha}^2\sigma_{-\alpha}^2 + 2B_0 B_{-\alpha}\sigma_0\sigma_{-\alpha}}$$

That is, $$X_n^{new} = \frac{1}{A}[X_n + B_0\sigma_0 X_{n-T_0} + B_{-\alpha}\sigma_{-\alpha} X_{n-T_{-\alpha}}]$$

holds. It is preferable that $B_0 > B_{-\alpha}$ as in the case of the first modification; however, even when $B_0 \leq B_{-\alpha}$, the effect of reducing discontinuity between frames caused by fluctuations in a pitch period can be obtained. Furthermore, this modification may be combined with the above-described second to fifth modifications.

That is, by being combined with the second modification, a predetermined value greater than or equal to 1 may be used as the amplitude correction factor A or the above processing may be performed without using the amplitude correction factor A.

By being combined with the third modification, as an output signal $X^{new}_n$ corresponding to a signal at each time n included in a time domain audio signal sample $X_n$ (L–N≤n≤L–1) of the current frame, a signal may be obtained, the signal including, in addition to the signal $X_n$ at the time n, the first signal for enhancement $X_{n-T_0}$, and the second signal for enhancement $X_{n-T_{-\alpha}}$, a signal (hereinafter also referred to as a third signal for enhancement, which is a pitch component corresponding to a pitch period of the β-th frame previous to the current frame) $X_{n-T_{-\beta}}$ at a time n–$T_{-\beta}$ that is an earlier time than the time n by the number of samples $T_{-\beta}$ corresponding to the pitch period $T_{-\beta}$ of the β-th frame previous to the current frame. Here, β≠α holds. For instance, when β>α, $$X_n^{new} = \frac{1}{A}[X_n + B_0\sigma_0 X_{n-T_0} + B_{-\alpha}\sigma_{-\alpha}X_{n-T_{-\alpha}} + B_{-\beta}\sigma_{-\beta}X_{n-T_{-\beta}}]$$

$$A = \sqrt{1 + B_0^2\sigma_0^2 + B_{-\alpha}^2\sigma_{-\alpha}^2 + B_{-\beta}^2\sigma_{-\beta}^2 + E + F + G}$$

$$E = 2B_0B_{-\alpha}\sigma_0\sigma_{-\alpha}$$

$$F = 2B_0B_{-\beta}\sigma_0\sigma_{-\beta}$$

$$G = 2B_{-\alpha}B_{-\beta}\sigma_{-\alpha}\sigma_{-\beta}$$

holds. It is preferable that $B_0 > B_{-\alpha} > B_{-\beta}$; however, even when this magnitude relationship is not satisfied, the effect of reducing discontinuity between frames caused by fluctuations in a pitch period can be obtained. In these cases, the pitch information storage 150 stores the pitch periods $T_0$, $T_{-1}, \ldots, T_{-\beta}$ and the pitch gains $\sigma_0, \sigma_{-1}, \ldots, \sigma_{-\beta}$ of the frames from the current frame to the β-th frame previous to the current frame. Moreover, as an output signal $X_n^{new}$ corresponding to a signal at each time n included in a time domain audio signal sample $X_n$ (L−N≤n≤L−1) of the current frame, a signal may be obtained, the signal including, in addition to the signal $X_n$ at the time n, the first signal for enhancement $X_{n-T\_0}$, the second signal for enhancement $X_{n-T\_-\alpha}$, and the third signal for enhancement $X_{n-T\_-\beta}$, Q (q+3)-th signals for enhancement $$X_{n-T_{-\gamma_q}}.$$

Here, q=1, 2, . . . , Q holds, Q is any one of integers greater than or equal to 1, and $\gamma_Q > \gamma_{Q-1} > \ldots > \gamma_1 > \beta$ holds. It goes without saying that, in this case, the pitch information storage 150 stores the pitch periods $T_0, T_{-1}, \ldots, T_{-\gamma\_Q}$ and the pitch gains $\sigma_0, \sigma_{-1}, \ldots, \sigma_{-\gamma\_Q}$ of the frames from the current frame to the $\gamma_Q$-th frame, which is the earliest frame, previous to the current frame.

By being combined with the fourth modification, in place of a value based on an earlier sample than each sample by each pitch period, which is added to each sample of an input audio signal in the processing which is performed by the pitch enhancement unit 130, an earlier sample than each sample by each pitch period in an audio signal that was passed through a low-pass filter may be used or an earlier sample than each sample by each pitch period in an audio signal subjected to processing equivalent to a low-pass filter may be used.

By being combined with the fifth modification, a configuration may be adopted in which, when the pitch gain $\sigma_0$ of the current frame is less than a predetermined threshold, the first signal for enhancement is not included in an output signal; when the pitch gain $\sigma_{-\alpha}$ of the α-th frame previous to the current frame is less than the predetermined threshold, the second signal for enhancement is not included in an output signal.

Furthermore, the modifications may be combined. For example, the third modification, the fifth modification, and the sixth modification may be combined so that, when the pitch gain $\sigma_{-\beta}$ of the β-th frame previous to the current frame is less than a predetermined threshold, the third signal for enhancement is not included in an output signal.

<Other Modifications>

Figure 3:
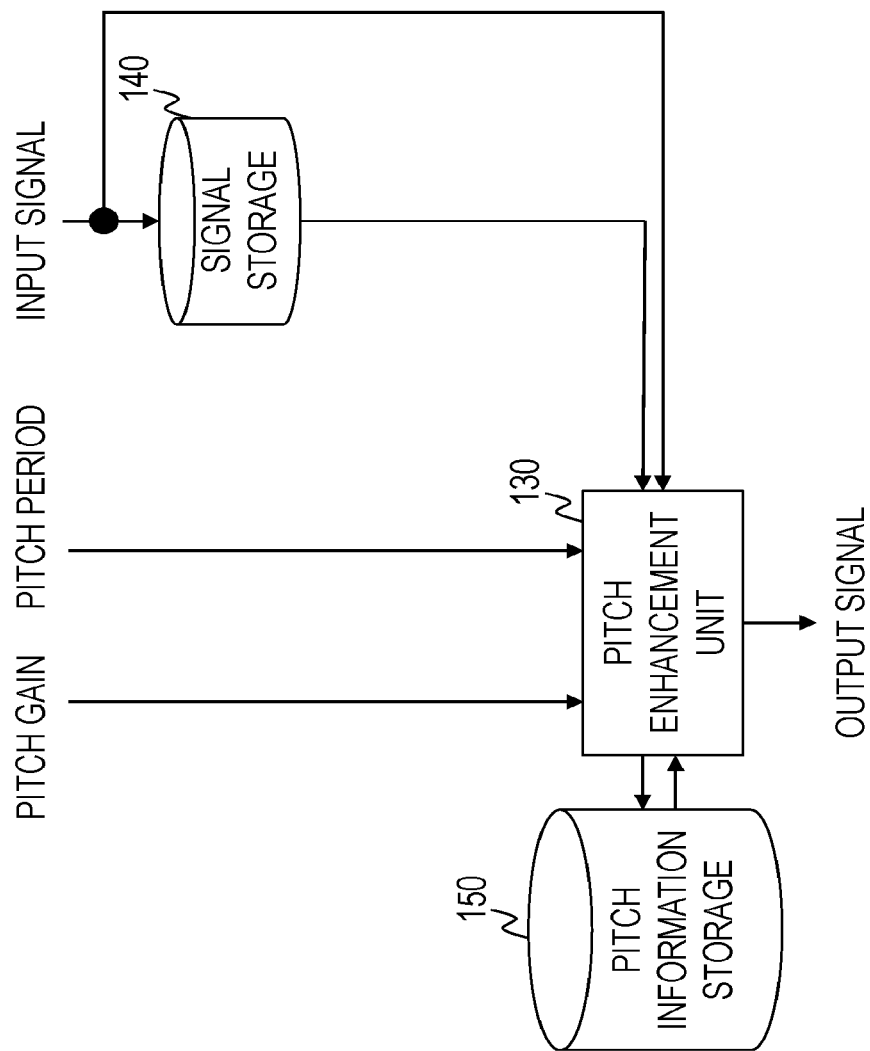
FIG. 3 is a functional block diagram of a pitch enhancement apparatus according to a modification of the first embodiment.
Figure 4:
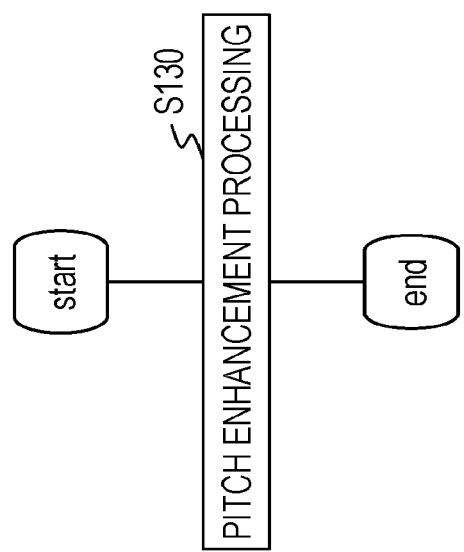
FIG. 4 is a diagram showing an example of a processing flow of the pitch enhancement apparatus according to the modification of the first embodiment.

When a pitch period and pitch gain of each frame are already obtained by, for example, decoding processing which is performed outside the speech pitch enhancement apparatus, the speech pitch enhancement apparatus may be configured as shown in FIG. 3 so as to enhance a pitch based on the pitch period and the pitch gain obtained outside the speech pitch enhancement apparatus. FIG. 4 shows a processing flow of this speech pitch enhancement apparatus. In this case, the speech pitch enhancement apparatus does not have to include the autocorrelation function calculation unit 110, the pitch analysis unit 120, and the autocorrelation function storage 160 of the speech pitch enhancement apparatus of the first embodiment. In this case, the pitch enhancement unit 130 only has to perform the pitch enhancement processing (S130) by using the pitch period and the pitch gain input to the speech pitch enhancement apparatus, not the pitch period and the pitch gain output from the pitch analysis unit 120. With this configuration, it is possible to make the amount of arithmetic processing of the speech pitch enhancement apparatus itself smaller than the amount of arithmetic processing in the first embodiment. However, the speech pitch enhancement apparatus of the first embodiment can obtain a pitch period and pitch gain independently of the frequency of obtaining a pitch period and pitch gain outside the speech pitch enhancement apparatus, which allows the speech pitch enhancement apparatus of the first embodiment to perform pitch enhancement processing in frames, each having a very short length of time. In the above-described case of a sampling frequency of 32 kHz, if N is assumed to be 32, for instance, the speech pitch enhancement apparatus of the first embodiment can perform pitch enhancement processing in 1-ms frames.

The above description is based on the assumption that pitch enhancement processing is performed on an audio signal itself; alternatively, the present invention may be applied as pitch enhancement processing which is performed on linear prediction residual in a configuration, which is described in Non-patent Literature 1, for example, in which linear prediction synthesis is performed after pitch enhancement processing is performed on linear prediction residual. That is, the present invention may be applied, not to an audio signal itself, but to a signal derived from an audio signal, such as a signal obtained by performing an analysis or processing on an audio signal.

The present invention is not limited to the above embodiment and modifications. For example, the above-described various kinds of processing may be executed, in addition to being executed in chronological order in accordance with the descriptions, in parallel or individually depending on the processing power of an apparatus that executes the processing or when necessary. In addition, changes may be made as appropriate without departing from the spirit of the present invention.

<Program and Recording Medium>

Further, various types of processing functions in the apparatuses described in the above embodiment and modifications may be implemented on a computer. In that case, the processing details of the functions to be contained in each apparatus are written by a program. With this program executed on the computer, various types of processing functions in the above-described apparatuses are implemented on the computer.

This program in which the processing details are written can be recorded in a computer-readable recording medium. The computer-readable recording medium may be any medium such as a magnetic recording device, an optical disk, a magneto-optical recording medium, and a semiconductor memory.

Distribution of this program is implemented by sales, transfer, rental, and other transactions of a portable recording medium such as a DVD and a CD-ROM on which the program is recorded, for example. Furthermore, this program may be distributed by storing the program in a storage device of a server computer and transferring the program from the server computer to other computers via a network.

A computer which executes such program first stores the program recorded in a portable recording medium or transferred from a server computer once in a storage thereof, for example. When the processing is performed, the computer reads out the program stored in the storage thereof and performs processing in accordance with the program thus read out. As another execution form of this program, the computer may directly read out the program from a portable recording medium and perform processing in accordance with the program. Furthermore, each time the program is transferred to the computer from the server computer, the computer may sequentially perform processing in accordance with the received program. Alternatively, a configuration may be adopted in which the transfer of a program to the computer from the server computer is not performed and the above-described processing is executed by so-called application service provider (ASP)-type service by which the processing functions are implemented only by an instruction for execution thereof and result acquisition. It should be noted that the program includes information which is provided for processing performed by electronic calculation equipment and which is equivalent to a program (such as data which is not a direct instruction to the computer but has a property specifying the processing performed by the computer).

Moreover, the apparatuses are assumed to be configured with a predetermined program executed on a computer. However, at least part of these processing details may be realized in a hardware manner.

What is claimed is:

1. A pitch enhancement apparatus that obtains an output signal by performing, for each time segment, pitch enhancement processing on a signal derived from an input audio signal, the pitch enhancement apparatus comprising:
processing circuitry configured to perform, as the pitch enhancement processing, for each time segment, processing to obtain, as an output signal at each time n of the time segment, a signal by performing operations including an addition by adding
a signal $X_n$ at the time n, n being an integer,
a first signal for enhancement $B_0 \sigma_0 X_{n-T0}$ that is obtained by multiplying a signal $X_{n-T0}$ at a time $n-T_0$ by a pitch gain $\sigma_0$ of the time segment and a predetermined coefficient $B_0$ which is a value less than 1, the time $n-T_0$ being an earlier time than the time n by a number of samples $T_0$ corresponding to a pitch period of the time segment, and
a second signal for enhancement $B_{-\alpha} \sigma_{-\alpha} X_{n-T-\alpha}$ that is obtained by multiplying a signal $X_{n-T-\alpha}$ at a time $n-T_{-\alpha}$ by a pitch gain $\sigma_{-\alpha}$ of an α-th time segment previous to the time segment and a predetermined coefficient $B_{-\alpha}$ which is a value less than 1, the time $n-T_{-\alpha}$ being an earlier time than the time n by a number of samples $T_{-\alpha}$ corresponding to a pitch period of the α-th time segment previous to the time segment.

2. The pitch enhancement apparatus according to claim 1, wherein the coefficient $B_{-\alpha}$ is a value less than the coefficient $B_0$.

3. The pitch enhancement apparatus according to claim 1, wherein
the processing circuitry is configured to obtain the signal as the output signal by dividing a result of the addition by $$\sqrt{1+B_0^2\sigma_0^2+B_{-\alpha}^2\sigma_{-\alpha}^2+2B_0 B_{-\alpha}\sigma_0\sigma_{-\alpha}}.$$

4. The pitch enhancement apparatus according to claim 1, wherein
the processing circuitry does not include the first signal for enhancement in the output signal when the pitch gain $\sigma_0$ of the time segment is less than a predetermined threshold.

5. The pitch enhancement apparatus according to claim 1, wherein
the processing circuitry does not include the second signal for enhancement in the output signal when the pitch gain $\sigma_{-\alpha}$ of the α-th time segment previous to the time segment is less than a predetermined threshold.

6. The pitch enhancement apparatus according to claim 1, wherein
the processing circuitry is configured to obtain the signal as the output signal by performing the addition by adding the signal $X_n$, the first signal for enhancement $B_0\sigma_0 X_{n-T0}$, the second signal for enhancement $B_{-\alpha}\sigma_{-\alpha} X_{n-T-\alpha}$, and a third signal for enhancement $B_{-\beta}\sigma_{-\beta} X_{n-T-\beta}$ that is obtained by multiplying a signal $X_{n-T-\beta}$ at a time $n-T_{-\beta}$ by a pitch gain $\sigma_{-\beta}$ of a β-th time segment previous to the time segment and a predetermined coefficient $B_{-\beta}$, the time $n-T_{-\beta}$ being an earlier time than the time n by a number of samples $T_{-\beta}$ corresponding to a pitch period of the β-th time segment previous to the time segment, and β being different from α.

7. A pitch enhancement method for obtaining an output signal by performing, for each time segment, pitch enhancement processing on a signal derived from an input audio signal, the pitch enhancement method comprising:
a pitch enhancement step of performing, as the pitch enhancement processing, for each time segment, processing to obtain, as an output signal at each time n of the time segment, a signal by performing operations including an addition by adding
a signal $X_n$ at the time n, n being an integer,
a first signal for enhancement $B_0\sigma_0 X_{n-T0}$ that is obtained by multiplying a signal $X_{n-T0}$ at a time $n-T_0$ by a pitch gain $\sigma_0$ of the time segment and a predetermined coefficient $B_0$ which is a value less than 1, the time $n-T_0$ being an earlier time than the time n by a number of samples $T_0$ corresponding to a pitch period of the time segment, and
a second signal for enhancement $B_{-\alpha}\sigma_{-\alpha} X_{n-T-\alpha}$ that is obtained by multiplying a signal $X_{n-T-\alpha}$ at a time $n-T_{-\alpha}$ by a pitch gain $\sigma_{-\alpha}$ of an α-th time segment previous to the time segment and a predetermined coefficient $B_{-\alpha}$ which is a value less than 1, the time $n-T_{-\alpha}$ being an earlier time than the time n by a number of samples $T_{-\alpha}$ corresponding to a pitch period of the α-th time segment previous to the time segment.

8. The pitch enhancement method according to claim 7, wherein the coefficient $B_{-\alpha}$ is a value less than the coefficient $B_0$.

9. The pitch enhancement method according to claim 7, wherein
the pitch enhancement step obtains the signal as the output signal by dividing a result of the addition by $$\sqrt{1+B_0^2\sigma_0^2+B_{-\alpha}^2\sigma_{-\alpha}^2+2B_0B_{-\alpha}\sigma_0\sigma_{-\alpha}}.$$

10. The pitch enhancement method according to claim 7, wherein
the pitch enhancement step does not include the first signal for enhancement in the output signal when the pitch gain $\sigma_0$ of the time segment is less than a predetermined threshold.

11. The pitch enhancement method according to claim 7, wherein
the pitch enhancement step does not include the second signal for enhancement in the output signal when the pitch gain $\sigma_{-\alpha}$ of the $\alpha$-th time segment previous to the time segment is less than a predetermined threshold.

12. The pitch enhancement method according to claim 7, wherein
the pitch enhancement step obtains the signal as the output signal by performing the addition by adding the signal $X_n$, the first signal for enhancement $B_0\sigma_0 X_{n-T0}$, the second signal for enhancement $B_{-\alpha}\sigma_{-\alpha} X_{n-T-\alpha}$, and a third signal for enhancement $B_{-\beta}\sigma_{-\beta} X_{n-T-\beta}$ that is obtained by multiplying a signal $X_{n-T-\beta}$ at a time n–$T_{-\beta}$ by a pitch gain $\sigma_{-\beta}$ of a $\beta$-th time segment previous to the time segment and a predetermined coefficient $B_{-\beta}$, the time n–$T_{-\beta}$ being an earlier time than the time n by a number of samples $T_{-\beta}$ corresponding to a pitch period of the $\beta$-th time segment previous to the time segment, and $\beta$ being different from $\alpha$.

13. The pitch enhancement method according to claim 8, wherein
the pitch enhancement step obtains the signal as the output signal by dividing a result of the addition by $$\sqrt{1+B_0^2\sigma_0^2+B_{-\alpha}^2\sigma_{-\alpha}^2+2B_0B_{-\alpha}\sigma_0\sigma_{-\alpha}}.$$

14. The pitch enhancement method according to claim 10, wherein
the pitch enhancement step does not include the second signal for enhancement in the output signal when the pitch gain $\sigma_{-\alpha}$ of the $\alpha$-th time segment previous to the time segment is less than a predetermined threshold.

15. A non-transitory computer-readable recording medium on which a program for making a computer execute a pitch enhancement method is recorded, the pitch enhancement method being for obtaining an output signal by performing, for each time segment, pitch enhancement processing on a signal derived from an input audio signal, and the pitch enhancement method comprising:
a pitch enhancement step of performing, as the pitch enhancement processing, for each time segment, processing to obtain, as an output signal at each time n of the time segment, a signal by performing operations including an addition by adding
a signal $X_n$ at the time n, n being an integer,
a first signal for enhancement $B_0\sigma_0 X_{n-T0}$ that is obtained by multiplying a signal $X_{n-T0}$ at a time n–$T_0$ by a pitch gain $\sigma_0$ of the time segment and a predetermined coefficient $B_0$ which is a value less than 1, the time n–$T_0$ being an earlier time than the time n by a number of samples $T_0$ corresponding to a pitch period of the time segment, and
a second signal for enhancement $B_{-\alpha}\sigma_{-\alpha} X_{n-T-\alpha}$ that is obtained by multiplying a signal $X_{n-T-\alpha}$ at a time n–$T_{-\alpha}$ by a pitch gain $\sigma_{-\alpha}$ of an $\alpha$-th time segment previous to the time segment and a predetermined coefficient $B_{-\alpha}$ which is a value less than 1, the time n–$T_{-\alpha}$ being an earlier time than the time n by a number of samples $T_{-\alpha}$ corresponding to a pitch period of the $\alpha$-th time segment previous to the time segment.

16. The non-transitory computer-readable recording medium according to claim 15, wherein the coefficient $B_{-\alpha}$ is a value less than the coefficient $B_0$.

17. The non-transitory computer-readable recording medium according to claim 15, wherein
the pitch enhancement step obtains the signal as the output signal by dividing a result of the addition by $$\sqrt{1+B_0^2\sigma_0^2+B_{-\alpha}^2\sigma_{-\alpha}^2+2B_0B_{-\alpha}\sigma_0\sigma_{-\alpha}}.$$

18. The non-transitory computer-readable recording medium according to claim 15, wherein
the pitch enhancement step does not include the first signal for enhancement in the output signal when the pitch gain $\sigma_0$ of the time segment is less than a predetermined threshold.

19. The non-transitory computer-readable recording medium according to claim 15, wherein
the pitch enhancement step does not include the second signal for enhancement in the output signal when the pitch gain $\sigma_{-\alpha}$ of the $\alpha$-th time segment previous to the time segment is less than a predetermined threshold.

20. The non-transitory computer-readable recording medium according to claim 15, wherein
the pitch enhancement step obtains the signal as the output signal by performing the addition by adding the signal $X_n$, the first signal for enhancement $B_0\sigma_0 X_{n-T0}$, the second signal for enhancement $B_{-\alpha}\sigma_{-\alpha} X_{n-T-\alpha}$, and a third signal for enhancement $B_{-\beta}\sigma_{-\beta} X_{n-T-\beta}$ that is obtained by multiplying a signal $X_{n-T-\beta}$ at a time n–$T_{-\beta}$ by a pitch gain $\sigma_{-\beta}$ of a $\beta$-th time segment previous to the time segment and a predetermined coefficient $B_{-\beta}$, the time n–$T_{-\beta}$ being an earlier time than the time n by a number of samples $T_{-\beta}$ corresponding to a pitch period of the $\beta$-th time segment previous to the time segment, and $\beta$ being different from $\alpha$.

* * * * *